3,383,347
EPOXY EMULSION COATINGS
Richard R. Pettit, La Habra, Calif., assignor to American
Pipe and Construction Co., Monterey Park, Calif., a
corporation of California
No Drawing. Filed Sept. 21, 1964, Ser. No. 398,091
16 Claims. (Cl. 260—28)

ABSTRACT OF THE DISCLOSURE

Epoxy or coal tar-epoxy coatings are produced by emulsifying the resin components in water, adding water-insoluble, water-dispersible pigments having a surface area in excess of 1 square meter per gram, and curing the mixture at room temperature by the addition of either bridged or unbridged phenol modified polyamines, which are separately packaged and are added to the pigmented emulsion just prior to use.

---

This invention relates to the curing at room temperature of water dispersed epoxy resins. More specifically, the invention involves coatings which contain water-dispersed epoxy resins, ultrafine pigments and a phenol modified polyamine curing agent. These epoxy resin coatings may also contain substantial quantities of water-dispersed coal tar pitch or water-dispersed petroleum pitch and filler.

Certain prior art epoxy coatings, including coatings containing a bituminous resin, have been cured with amine curing agents at room temperature. It is the nature of such epoxy coatings to be so highly viscous at room temperature that they cannot be applied by conventional coating application techniques unless a quantity of organic solvents such as aromatic hydrocarbons, ketones or esters are incorporated into the product. Such solvents in sufficient concentrations are both flammable and highly toxic and present a hazard to the coating applicator, particularly when applied in confined areas.

In the present invention, the coatings are first brought to application consistencies by emulsifying the resin components in water. This device results in resin dispersions of relatively low viscosity which will cure at room temperature when combined with certain modified polyamines in the presence of ultrafine pigments.

The phenol modified polyamines which will coreact with the epoxy resin in this invention are unusual but not as such unknown in the coatings art. There are two general types: Unbridged phenol modified polyamines which are the reaction product of a phenol and an aliphatic amine described in United States Patent 2,974,121; and bridged phenol modified polyamines which are the condensation product of an aliphatic amine with a phenol and an aldehyde described in British Patent 836,767. Both patents teach that their respective curing agents are more compatible with epoxy resins and less sensitive to the presence of moisture than unmodified aliphatic amines; however, no claim is made that these modified amines will cure water dispersed epoxy resins. Furthermore, it has been empirically determined that the simple addition of such modified amines to a water emulsion of epoxy resin will not result in a coreacted product.

The present invention involves the discovery that the coreaction of unbridged and bridged amines at room temperature with an epoxy resin emulsified in water is made possible by the addition to the amine-epoxy mixture of ultrafine pigments having a surface area in excess of 1.0 square meter per gram as determined by nitrogen adsorption (B.E.T. Method). Further restrictions on such pigments are that they must be water insoluble and capable of being finely dispersed in water. A far from complete list of such pigments is given below:

(1) synthetic silicon dioxide
(2) natural silicon dioxide
(3) kaolin clays
(4) bentonite and attapulgite clays
(5) calcium silicate
(6) carbon black
(7) various metal oxides such as titanium dioxide, iron oxide, chromic oxide, magnesium oxide, and aluminum oxide.

I have found that for an effective coreaction of the bridged and unbridged modified amines with the emulsified epoxy resins, the ultrafine pigments described above must be in such concentration in the mixture to assure a minimum of 400 square meters of surface area for each 100 grams of epoxy resin. Thus $$WS > 400$$

(approximately 1000 for optimum curing properties), in which $W$ = weight of pigment in grams per hundred grams of epoxy resin.
$S$ = surface area of pigment in square meters per gram.

Resins applicable

Epoxy resins as used herein are identified as those epoxy resins which are liquid at room temperature and are essentially the diglycidyl ethers of dihydric phenols and preferably the condensation products of epichlorohydrin and bisphenol-A. An idealized structure for such a resin which is a syrupy liquid at room temperature (75° F.) is:

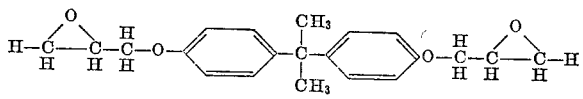

Ideally, the resin should possess a molecular weight of 340 and an epoxy equivalent weight (E.E.W.) of 170. Commercially available resins of this type commonly have molecular weights of about 380 due to the presence of minor amounts of higher molecular weight polyepoxide molecules, which in no way affect the performance of the resin in this invention. Resins of this type with average molecular weights as high as about 500 are considered operable within this invention.

The addition of minor amounts of lower molecular weight epoxide molecules and other diluents such as organic solvents and plasticizers are considered within the scope of this invention, although such additives are not particularly desirable because they tend to impair the physical properties and chemical resistance of the cured resin.

Certain hydrocarbon resins such as coal tar pitch or petroleum pitch may also be emulsified and used with the epoxy resin emulsion to make coatings with properties essentially identical to those of solvent-dispersed coal tar-epoxy coatings which are well known in the coatings art. These pitches may range from resins which are liquids to those which are solids or semisolids at 75° F. In the case of the latter, minor additions of organic solvents such as the aromatic hydrocarbons, ketones or esters to the pitches are necessary to put them in a sufficiently fluid state for emulsification. The liquid resins are readily emulsified without the addition of organic solvent.

Composition of curing agents

The curing agents used in this invention are of two types:

(1) reaction products of aliphatic amines and phenols (unbridged phenol modified polyamines);
(2) reaction products of aliphatic amines with aldehydes and phenols (bridged phenol modified polyamines).

The aliphatic amine portion is common to both types and may be any polyamine containing a minimum of two amino groups, at least one (and preferably two or more) of which is a primary amine group (i.e., having two reactive hydrogen atoms attached directly to the nitrogen), the nitrogen being attached directly to an alkyl carbon atom. Aryl and other substituents are permissible provided the primary amino groups are attached to the alkyl portion of the molecule, and provided other requirements of a polyamine are met. The following polyamines are examples which may be used:

ethylene diamine
diethylene triamine
dipropylene triamine
triethylene tetramine
tetraethylene pentamine
1,6-hexanediamine
1,7-heptanediamine
1,8-octyldiamine
1,9-nonyldiamine
m-xylylene diamine.

Modifications in the above polyamines by which one primary amine nitrogen is reacted with a mono or polyepoxide molecule to form a so-called "amine adduct" do not interfere with the ability of these compounds to coreact with the epoxy resins in the invention.

The phenol compounds which are suitable for both types of curing agent contain at least one monohydroxyphenyl group per molecule and the derivatives of the same, such as the halogenated, alkylated and nitrated phenols. The following are examples of compounds which may be used: phenol (monohydroxybenzene), the isomers of cresol and xylenol, isomers of chlorophenol and bromophenol, nitrophenol, p-tertiary butyl phenol, and other alkylated phenols and dinuclear phenols.

Preparation of curing agents

Type 1.—Reaction products of aliphatic amines and phenols (unbridged amines). These compounds can be prepared simply by mixing the polyamine with the phenols. The exothermic reaction which takes place will cause the temperature to rise. By careful addition of the phenol, the mixture can be held at 150° F. during the initial reaction. However, the mixture should be held at 125°–150° F. for additional four hours to insure complete reaction.

It is essential that the ratio of phenolic hydroxyl equivalents to equivalents of primary amine groups in the amine be such that there is at least one of the former for each two of the latter. Lower ratios will result in poor cures with the epoxy resins, while higher ratios up to 2.5 phenol hydroxyls per primary amine group are satisfactory. Larger amounts of phenol will result in poor physical and chemical resistance properties in the cured film due to the presence of the unreacted compound.

Type 2.—Reaction products of phenols with aldehyde modified amines (bridged amines). Type 2 differs from Type 1 in that low molecular weight aldehydes such as formaldehyde, acetaldehyde, or propionaldehyde are incorporated into the molecule. The aldehydes serve as bridges between a primary amine group of the polyamine and the unsubstituted ortho or para positions of the phenol. The molar ratio of aldehyde to amine is 3:3, while the molar concentration of the phenol may vary from 1 to 3 to form compounds of the following configuration:

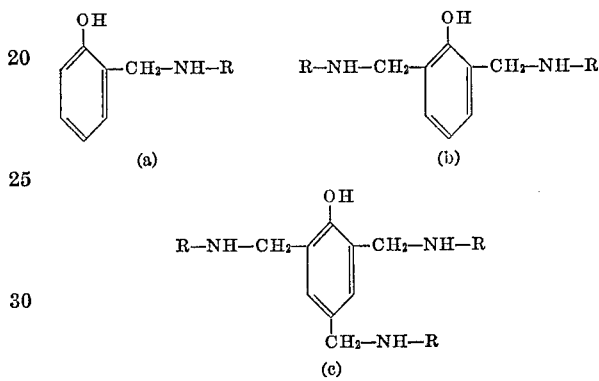

Compounds of this type can be prepared by one of two methods:

(A) Slow addition of aldehyde to chilled amine, holding the reaction temperature below 85° F., followed by addition of the phenol. The final mixture is heated between 185° and 200° F. for 1½ hours to insure reaction of the phenol.

(B) Addition of the amine to the phenol, chilling the mixture, and then adding the aldehyde at a slow rate to hold the reaction temperature below 85° F.

The purpose of holding the temperature below 85° F. in both methods during the addition of the aldehyde is to avoid the formation of high molecular weight polymers in preference to the amine adduct.

The following are examples of unbridged and bridged curing agents prepared as described in the preceding section:

Unbridged curing agents

Example I:
  p-Chlorophenol _____ 94.5
  Tetraethylene pentamine _____ 94.5
                                          ─────
                                          189.0

Example II:
  Amine adduct of diethylene triamine [1] _____ 120.5
  Phenol (monohydroxy benzene) _____ 131.7
                                          ─────
                                          252.2

[1] The amine adduct is the reaction product of eight moles of diethylene triamine with one mole of a diepoxide resin described previously under "Resins Applicable."

Example III:
  A mixture of m- and p-cresols (61/39) _____ 132
  m-Xylylene diamine _____ 136
                                          ─────
                                          268

Example IV:
  Bisphenol-A _____ 171
  Tetraethylene pentamine _____ 189
                                          ─────
                                          359

Bridged curing agents

| Example V: | M.W. | Molar ratio |
|---|---|---|
| Diethylene triamine | 309 | 3 |
| 90% phenol | 104 | 1 |
| 37% formaldehyde | 244 | 3 |
| | 657 | |
| Example VI: | | |
| Triethylene tetramine | 438 | 3 |
| 90% phenol | 104 | 1 |
| 37% formaldehyde | 244 | 3 |
| | 786 | |
| Example VII: | | |
| Tetraethylene pentamine | 378 | 2 |
| p-Chlorophenol | 129 | 1 |
| Propionaldehyde | 116 | 2 |
| | 623 | |
| Example VIII: | | |
| Diethylene triamine | 206 | 2 |
| m-Cresol | 108 | 1 |
| 37% formaldehyde | 162 | 2 |
| | 476 | |

Examples V through VIII are typical of compositions which satisfy the requirements of the bridged curing agent. However, numerous other combinations of amines, phenols, and aldehydes in several possible molar ratios, such as diethylene triamine/phenol/furfural (3:1:1),
tetraethylene pentamine/phenol/acetaldehyde (3:1:3),
diethylene triamine/chlorophenol/formaldehyde (2:1:2),
diethylene triamine/o-amiophenol/formaldehyde (2:1:2),
diethylene triamine/m-aminophenol/formaldehyde (2:1:2),
diethylene triamine/p-aminophenol/formaldehyde (2:1:2),
diethylene triamine/o-nitrophenol/formaldehyde (2:1:2),
diethylene triamine/o-cresol/formaldehyde (2:1:2),
ethylene diamine/phenol/formaldehyde (3:1:2.4),
diethylene triamine/phenol/formaldehyde (3:1:2.4),
aminoethyl ethanolamine/phenol/formaldehyde (2:1:2),
m-xylylene diamine/phenol/formaldehyde (2:1:2),
imino-bis-propylamine/phenol/formaldehyde (3:1:2.4),
and tetraethylene pentamine/p-chlorophenol/formaldehyde (1:1:1), respectively, are equally satisfactory.

Bridged and unbridged curing agents, when used in the proper concentrations, will coreact with water-dispersed epoxy resins if, as stated above, the ratio of pigment surface area to the latter is greater than 400 square meters per 100 grams. An example of the preparation of a suitably pigmented emulsion is:

Example IX

Step 1: Preparation of epoxy resin emulsion.—Dissolve 3 grams of a nonionic wetting agent, such as, for example, "Pluronic F108," in 12 grams of water and add slowly with constant stirring to 100 grams (0.53 epoxy equivalents) of a liquid diepoxy resin, such as, for example, "Epon 828," to form a homogeneous water-in-oil emulsion. Continue stirring and add 39 grams of water, thereby inverting the mixture to a white oil-in-water emulsion of about 1500 centipoise viscosity and containing 65% epoxy resin.

Step 2: Addition of pigments.—Add 1.0 gram of an anionic dispersing agent, such as, for example, "Nopcosant L," to the 154 grams of the product obtained by Step 1. Stir with high shear propeller type mixer while adding 63 grams of titanium dioxide such as, for example, "Titanox RA-NC," 43 grams kaolin group clay such as, for example, "ASP 100," 156 grams barytes, and 70.8 grams water. The addition of water should be controlled so as to maintain high viscosity at all times during addition and dispersion of pigments. The respective surface areas in square meters contributed by the "Titanox" and "ASP 100" are 63 gr.×8 m.²/gr. and 43 gr.×13 m.²/gr. for a total of 1063 m.², well above the necessary 400.

As with conventional solvent-dispersed epoxy resins cured by unmodified aliphatic amines, the epoxy emulsion and the phenol modified polyamine curing agent (either bridged or unbridged) must be combined in a proportion which provides one amine equivalent, i.e., one amine hydrogen, for each epoxy equivalent. The following table indicates the weight of each curing agent which will react with 487.8 grams or 0.53 epoxy equivalents of the pigmented emulsion of Example IX to convert the latter to a hard film insoluble both in water and in the common epoxy resin solvents:

Curing agent (amine equivalent) _____ 0.53
Example—
  I _____grams__ 28.4
  II _____do____ 34.9
  III _____do____ 35.0
  IV _____do____ 27.0
  V _____do____ 25.4
  VI _____do____ 27.5
  VII _____do____ 29.7
  VIII _____do____ 31.4

The formation of water-dispersed coal tar-epoxy coatings and other hydrocarbon resin-modified epoxies can be accomplished by emulsifying the modifying resin with the aid of the curing agents and the ultrafine pigments described previously. The pigmented, hydrocarbon resin-modified amine emulsions can then be combined with the epoxy resin of Step 1, Example IX, to make protective coating films of the same properties as their solvent-dispersed analogues.

A quantity of such a water-dispersed, resinous curing compound sufficient to react with 154 grams (0.53 epoxy equivalents of the epoxy emulsion of Step 1, Example IX, may be prepared as follows:

Dissolve 2.0 grams of concentrated ammonium hydroxide (15.1 N), 1 gram of sodium silicate, and 1.5 grams of a nonionic wetting agent in 137.7 grams of water. Stir in 50 to 80 parts of a kaolin clay, such as, for example, "ASP 100," followed by slightly more than 0.53 amine equivalents of one of the amine curing agents in Examples I–VIII. While stirring constantly, add 80 to 120 parts of the liquid hydrocarbon resin or a concentrated solution of a solid resin in organic solvent. Inversion of the resin to form an oil-in-water emulsion occurs during this step. Add 175 to 200 grams of a finely divided, low adsorptive pigment such as barytes and stir at high speed until the pigment is dispersed. The product will be a thixotropic emulsion.

Specific examples of formulations which will coreact with 154 grams of the epoxy emulsion of Step 1, Example IX, are

| Example X: | Grams |
|---|---|
| Water | 137.7 |
| Concentrated ammonium hydroxide | 2.0 |
| Nonionic wetting agent ("Pluronic F68") | 1.5 |
| Kaolin clay ("ASP 100") | 67.8 |
| Liquid coal tar resin ("C.P. 524") | 100.0 |
| Sodium silicate | 1.0 |
| Barytes | 184.0 |
| Product of Example II | [1] 39.0 |
| | 533.0 |

[1] Slight excess over the 34.9 grams required for 0.53 equivalent.

Pigment surface area to 100 grams of epoxy resin = (67.8×13) = 881 square meters.

Example XI:                                          Grams
    Water _____  131.0
    Concentrated ammonium hydroxide _____   2.0
    Nonionic wetting agent ("Pluronic F68") ___   1.5
    Kaolin clay ("ASP 100") _____  53.8
    85% hard petroleum pitch in xylol _____  88.2
    Sodium silicate _____   1.0
    Barytes _____ 184.0
    Product of Example II _____ ¹39.0
                                                 -----
                                                 500.5

Example XII:                                         Grams
    Water _____  164.4
    Nonionic wetting agent ("Pluronic F68") ___   2.5
    Kaolin clay ("ASP 100") _____  72.0
    Liquid coal tar resin ("C.P. 524") _____ 150.0
    Sodium silicate _____   1.0
    Barytes _____ 268.0
    Example VII _____  36.0
                                                 -----
                                                 693.9

Example XIII:                                        Grams
    Water _____  139.5
    Nonionic wetting agent ("Pluronic F68") __   1.5
    Kaolin clay ("ASP 100") _____  53.8
    85% hard petroleum pitch in xylol _____  88.2
    Sodium silicate _____   1.0
    Barytes _____ 300.0
    Example VII _____  36.0
                                                 -----
                                                 620.0

¹ Slight excess over the 34.9 grams required for 0.53 equivalent.

Protective coatings made from the combinations of Example IX with equivalent amounts of Examples I through VIII cure to hard, tough films having excellent adhesion to steel. All combinations have workable pot lives, ranging from 3 to 30 hours at 77° F. Their application properties by standard spray apparatus, and their performances in corrosive environments are essentially those of the conventional solvent-deposited aliphatic amine cured epoxies. Like the latter, the coatings of the invention, when cured, are no longer soluble in organic solvents.

For the hydrocarbon resin-modified epoxy coatings, a slight excess of amine is used to allow for some loss of effective concentration during the emulsification of the modifying resins. Coatings made from the epoxy emulsion of Step 1, Example IX, in combination with any of the curing agents (Examples X–XIII), cure to films with properties essentially identical to the so-called coal tar-epoxy coatings which are well known in the coatings art.

The coatings of this invention permit the use of resin combinations of established merit without the fire and toxicity hazards inherent in their solvent-based analogues. It will be understood, of course, that the pigmented emulsion and the curing agent are packaged separately for storage, and are not admixed until the composition is ready to use. Obviously, the teachings of this invention can be carried out in many ways, of which the examples described above are merely illustrative. Therefore, the invention is not to be deemed limited by the foregoing description, but only by the scope of the following claims.

What I claim and desire to secure by Letters Patent is:

1. The method of producing a room-temperature-cured epoxy resin coating composition by mixing: a water-based epoxy resin emulsion containing a concentration of pigment sufficient to provide in excess of 400 square meters of surface area for each 100 grams of epoxy resin, said pigment being water-insoluble, having a surface area in excess of 1 square meter per gram, and being finely dispersible in water; and a phenol modified polyamine curing agent; and allowing the same to cure.

2. The method of claim 1 in which the phenol modified polyamine is an aliphatic polyamine modified by the reaction of one primary amine group with a phenol.

3. The method of claim 1 in which the modified polyamine is the reaction product of an aliphatic polyamine containing at least two amino-nitrogen groups, at least one of which is an alkyl bonded primary amine group, with a phenol having at least one hydroxyphenol group per molecule, the molar ratio of said hydroxyphenol groups to primary amine groups being between 0.5 and 2.5.

4. The method of claim 1 in which the phenol modified polyamine is an aliphatic polyamine modified by the reaction of one primary amine group with a phenol and an aldehyde.

5. The method of claim 4 in which the modified polyamine is the reaction product of an aliphatic polyamine containing at least two amino-nitrogen groups, at least one of which is an alkyl bonded primary amine group, with an aldehyde and with a phenol having at least one hydroxyphenol group per molecule.

6. The method of claim 4 in which the modified polyamine is the reaction product of an aliphatic polyamine containing at least two amino-nitrogen groups, at least one of which is an alkyl bonded primary amine group, with an aldehyde taken from the group consisting of formaldehyde, acetaldehyde, propionaldehyde or furfural, and with a phenol having at least one hydroxyphenol group per molecule.

7. The method of claim 4 in which the modified polyamine is the reaction product of an aliphatic amine, an aldehyde, and a phenol in the molar ratio of 3:3:1.

8. The method of claim 4 in which the modified polyamine is the reaction product of an aliphatic amine, an aldehyde, and a phenol in the molar ratio of 2:2:1.

9. The method of claim 4 in which the modified polyamine is the reaction product of an aliphatic amine, an aldehyde, and a phenol in the molar ratio of 1:1:1.

10. The method of producing a hydrocarbon resin modified epoxy coating curing at room temperature, by mixing an epoxy resin emulsion; an emulsion of a hydrocarbon resin containing an aliphatic polyamine curing agent modified by the reaction of one primary amine group with a phenol; and a pigment of sufficient concentration to provide a pigment surface area in excess of 400 square meters per 0.53 amine hydrogen equivalents present, said pigment being water-insoluble, having a surface area in excess of 1 square meter per gram, and being finely dispersible in water; and allowing the same to cure.

11. The method of claim 10 in which the hydrocarbon resin is a liquid coal tar, and said modified polyamine is the reaction product of an aliphatic polyamine with a phenol.

12. The method of claim 10 in which the hydrocarbon resin is a liquid coal tar, and said modified polyamine is the reaction product of an aliphatic polyamine with a phenol and an aldehyde.

13. The method of claim 10 in which the hydrocarbon resin is a solid coal tar dissolved in organic solvent prior to emulsification, and said modified polyamine is the reaction product of an aliphatic polyamine with a phenol.

14. The method of claim 10 in which the hydrocarbon resin is a solid coal tar dissolved in organic solvent prior to emulsification, and said modified polyamine is the reaction product of an aliphatic polyamine with a phenol and an aldehyde.

15. The method of claim 10 in which the hydrocarbon resin is a solid petroleum pitch dissolved in organic solvent prior to emulsification, and said modified polyamine is the reaction product of an aliphatic polyamine with a phenol.

16. The method of claim 10 in which the hydrocarbon resin is a solid petroleum pitch dissolved in organic solvent prior to emulsification, and said modified polyamine is the reaction product of an aliphatic polyamine with a phenol and an aldehyde.

References Cited

UNITED STATES PATENTS

| | | | |
|---|---|---|---|
| 3,050,493 | 8/1962 | Wagner et al. | 260—37 |
| 3,168,488 | 2/1965 | Sommer | 260—28 |
| 3,238,165 | 3/1965 | Simpson et al. | 260—28 |
| 3,275,587 | 9/1966 | Weller et al. | 260—29.2 |

FOREIGN PATENTS

| | | |
|---|---|---|
| 1,315,282 | 12/1962 | France. |
| 886,767 | 1/1962 | Great Britain. |

MORRIS LIEBMAN, *Primary Examiner.*

B. A. AMERNICK, *Assistant Examiner.*